United States Patent [19]

Czech

[11] Patent Number: 4,856,679

[45] Date of Patent: Aug. 15, 1989

[54] DISPENSER FOR PASTY PRODUCTS

[76] Inventor: Joachim Czech, Jahnstr. 19, 8405 Donaustauf, Fed. Rep. of Germany

[21] Appl. No.: 151,400

[22] Filed: Feb. 2, 1988

[30] Foreign Application Priority Data

Nov. 6, 1987 [DE] Fed. Rep. of Germany ....... 3737832

[51] Int. Cl.[4] .......................... B67D 5/52; B67D 5/42; G01F 11/00

[52] U.S. Cl. .................................... 222/136; 222/256; 222/340; 222/386

[58] Field of Search ................ 222/207, 209, 256–260, 222/340, 341, 380, 383, 385, 386, 391, 387, 135, 136

[56] References Cited

U.S. PATENT DOCUMENTS 2,789,731 4/1957 Marraffino .......................... 222/129
4,461,403 7/1984 Prahs .................................... 222/94
4,515,298 5/1985 Czech ................................. 222/380
4,657,161 4/1987 Endo et al. .......................... 222/256
4,671,432 6/1987 Benecke et al. ..................... 222/256
4,691,847 9/1987 Ford et al. .......................... 222/383

*Primary Examiner*—Joseph J. Rolla
*Assistant Examiner*—Steve Reiss
*Attorney, Agent, or Firm*—James E. Nilles; Donald C. McGaughey

[57] ABSTRACT

The invention relates to a piston dispenser for pasty products which has a single dispensing passage for simultaneously dispensing two products such as a stripe on toothpaste. The dispenser has a pump chamber (5) of a delivery mechanism and a stripe chamber (6) of a dispensing unit (A) disposed radially adjacent one another in free communication with the interior cavity (3) of the dispenser without the provision of valves. The dispensing unit (A) also includes the dispensing passage (29') which has an opening in communication with the stripe chamber.

23 Claims, 2 Drawing Sheets

DISPENSER FOR PASTY PRODUCTS

BACKGROUND OF THE INVENTION

1. Field of the Invention

The invention relates to a dispenser for pasty products, comprising a container having a cavity for containing the product. The bottom end of the container is closed by a follower piston slidably is placeable along an inner wall of the container by the action of environmental atmospheric pressure, and upper end of the container is provided with a head assembly including a manually operable delivery mechanism with a pump chamber and a delivery piston therein, and a product dispensing unit with a dispensing passage.

2. Description of the Prior Art

Dispensers of this type are generally known as portable supply units for numerous applications, for instance, for dispensing skin lotions and pasty medical products, household chemicals and shoe polishes, and also for the supply of pasty foods, condiments and spice compositions.

The great number of specific applications each with their respective design requirements has resulted in a great variety of dispensers of different design for use with different pasty products. The dispensing and handling mechanisms of many of these dispensers are rather complicated as regards their construction and/or operation. Numerous dispensers of known construction have been found unable to ensure a clean dispensing operation and accurate metering of the product to be dispensed over an extended period of use.

Already described in German Patent Application 36 01 311.0 is a dispenser for pasty products in which the product is fed to the dispensing mechanism by means of a follower piston subjected to the action of atmospheric pressure, the product entering the pump cylinder through a first valve and being dispensed therefrom through a second valve disposed in the pump piston and through a tubular actuating stem of the piston which incorporates the dispensing outlet passage. This construction requires a relatively expensive double-valve arrangement, and the dispensing of the product is accompanied by a continuous movement of the outlet opening together with the tubular actuating stem, so that it may be difficult to accurately deposit the product to be dispensed at a desired location. Further, it is difficult to provide for dispensing a two component extrusion.

SUMMARY OF THE INVENTION

It is therefore an object of the invention to provide a dispenser of the type defined in the introduction, which dispenser should have a dispensing unit and delivery mechanism of simple and reliably operable construction, be capable of dispensing a product accurately at a desired location, and permit the outer shape of the dispenser to be varied within a wide range. In addition, the dispenser should be capable of simultaneously dispensing a combined two component extrusion through one dispensing passage outlet.

These objects are attained according to the invention by provision that a pump chamber and a stripe chamber of a delivery mechanism are disposed radially adjacent one another and not provided with any valve to thus be in open free communication with the container cavity.

The disposition of the delivery mechanism and the dispensing unit radially adjacent one another without a movement-transmitting connection therebetween permits the dispenser to be designed with any advantageous shape, for instance, in the shape of a cylinder having an oval or elliptical cross-sectional shape or in any other suitable shape without resulting in difficulties-/as regard the construction of the head assembly of the dispenser. This permits ergonomical and aesthetical aspects to be taken into consideration in the design of the dispenser.

In accordance with a preferred embodiment of the invention, the stripe chamber cylinder and the pump chamber cylinder are juxtaposed radially adjacent one another so as to have a common wall portion. This permits the container, the stripe chamber cylinder and the pump cylinder to be manufactured advantageously as an integral unit, preferably an injection-molded plastic structure.

In accordance with another advantageous embodiment of the invention, a reliable shut-off or closure function of the dispenser is obtained by the provision that the dispensing unit, which substantially comprises the stripe chamber cylinder and at least one nozzle body connected thereto and defining a dispensing passage between the upper portion of the container and an outlet opening, is additionally provided with a shutter member operable to open and close the outlet opening at the end of the dispensing passage so as to keep the dispensing and outlet portions of the dispenser clean during and after operation.

According to another advantageous aspect of the invention, the dispenser is adapted to dispense pasty products in the form of an extrusion having colored stripes on its surface, for instance, a two component toothpaste. To this purpose, a tubular first nozzle body may be inserted into the stripe chamber cylinder in the manner of a mandrel and provided adjacent the upper end of the annular space forming the stripe chamber with circumferentially spaced color dispenser openings, slots or the like. For preventing uncontrolled mixing of the pasty main product with a colored pasty product contained in the stripe chamber for the formation of longitudinal color strips on the main product extrusion, the length of the first nozzle body within the stripe chamber substantially corresponds to the height thereof, i.e., to the length of the chamber in the axial direction of the dispenser.

A further portion of the dispensing passage partially formed by the first nozzle body is preferably defined by a second nozzle body formed with the outlet opening and mounted on respective parts of the outer peripheral surfaces of the stripe chamber cylinder and the pump cylinder by a snap-fit connection.

The second nozzle body is preferably also formed with a pocket acting as a support for the shutter member cooperating with the outlet opening. The second nozzle body may advantageously also act as a guide for an actuating cap of the dispenser.

In a particularly simple construction of the dispenser, the pump chamber has an open lower end communicating with the interior of the container, and contains a slidable piston secured by a snap-fit connection to one end of an elongate tubular actuating stem, the other end of which carries the actuating cap for operating the dispenser. A tubular sleeve formed on the top of the pump cylinder acts as a guide for the tubular actuating stem and at the same time as a radial support for a return coil spring extending between the top surface of the pump cylinder and the actuating cap.

In accordance with an advantageous embodiment of the invention, the outlet opening of the dispenser is adapted to be closed by a shutter member which is opened when the dispenser is operated to dispense a product. This shutter member is preferably formed in the shape of an angular plastic strip member having an upper closure portion and a lower foot portion to be received in the pocket of the second nozzle body. The opening operation of the shutter member may advantageously be achieved by means of two integrally formed actuating fingers projecting at an angle from both sides of the foot portion and engaged adjacent their angled root portions by respective elements of the actuating cap. In this manner, the depression of the actuating cap for operating the dispenser results in a downwards directed force being transmitted to the root portions of the actuating fingers, causing the top portion of the shutter member to perform an arcuate pivot movement with a portion adjacent the root portions of the actuating fingers acting as a hinge of the shutter member.

A preferred embodiment of the invention shall now be described in detail by way of example with reference to the accompanying drawings.

DESCRIPTION OF THE PREFERRED EMBODIMENT

Figure 1:
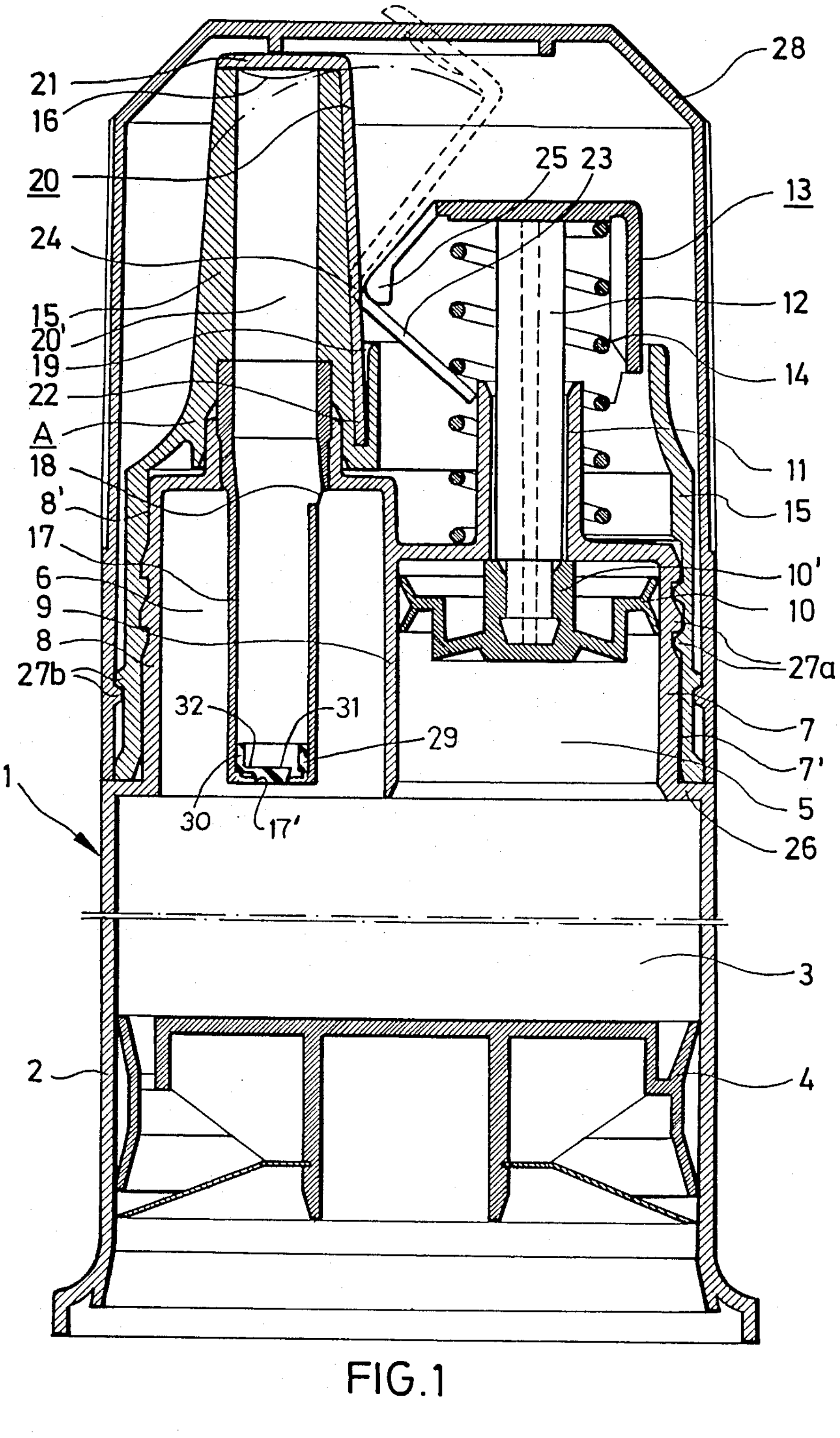
FIG. 1 shows a longitudinally sectioned view of a dispenser according to an embodiment of the invention.

With reference initially to FIG. 1, there is shown a longitudinally sectioned view of a dispenser 1 for pasty products according to the present invention. A product to be dispensed (not shown), for instance, toothpaste, is contained in a container 2 having wall means defining an interior cavity 3 having a top end in open communication with a pump chamber 5 and a stripe chamber 6. The container also has an open bottom end portion. Pump chamber 5 and stripe chamber 6 are defined, respectively, by a pump cylinder 7 and a stripe chamber cylinder 8 disposed radially adjacent one another and having a common wall portion 9. The pump chamber 5 and stripe chamber 7 have first and second openings that are in open free communication with the container cavity 3. A delivery piston 10 is slidably mounted in cylinder 7. Pump cylinder 7 and stripe chamber cylinder 8 are integrally formed with container 2, preferably as an injection-molded plastic structure. With the exception of a return spring 14, the other components of dispenser 1 to be described are also made of an injection-moldable plastic material, preferably polyethylene or polypropylene, so that on the one hand, dispenser 1 is very lightweight, and on the other hand, there is no undesirable chemical reaction between the product to be dispensed and the parts of dispenser 1 coming into contact with the product. For continuously feeding the pasty product upwards within container cavity 3 and into pump chamber 5, the dispenser is provided with a follower piston 4 slidably displaceable along an inner wall surface of container 2 by the action of atmospheric pressure and piston 4 is prevented from sliding backwards by an expansion spring. The pasty product is thus always subjected to the action of atmospheric pressure through follower piston 4. This ensures, in a very simple manner, the feeding of the first pasty product upwards within container 2 and towards a delivery piston 10, while preventing a vacuum from being created within container 2 as the pasty product is dispensed from dispenser 1. Stripe chamber cylinder 8 is open at its bottom towards container 2 and has an upper portion formed with a retainer neck extension having an opening therethrough. Thus pressure applied to the first product in cavity 3, to a certain extent, will also be transmitted through the first product to a second product in the stripe chamber 6 to cause the second product to pass through the port opening 18. The passing of the first or main product through dispensing passage 20′ past the port opening 18 will also serve to draw the second product through the port opening 18 and cause it to be deposited on the main product as it passes through discharge passage 20′.

A nozzle body, which is mounted in the opening in the upper portion of the stripe chamber 8, will now be described. The nozzle body comprises first and second tubular nozzle body portions 15, 17. The first tubular nozzle body 17 is inserted into the neck extension and has a length that substantially corresponds to the axial length of the stripe chamber. Thus, first body portion 17 projects into stripe chamber 6, in the manner of a mandrel, and extends substantially to the level of the transition from stripe chamber 6 to the container's interior cavity 3, so that stripe chamber 6 has the shape of an annular space. The lower end face of first nozzle body 17 is formed with an opening 17′ acting as the inlet of dispensing passage 20′, and said lower inlet end portion of the first nozzle body 17 supports a nonreturn valve means 29 having a closure member or flap 31 engaging said inlet opening 17′. The nonreturn valve 29 is integrally made of synthetic resin comprising a valve sleeve 30 inserted into the inner lower end portion of the first nozzle body 17, thus surrounding the inlet opening 17′. Closure flap 31 is preferably cut from the bottom portion of the valve sleeve 30 along part of its inner periphery leaving an integral material web 32 which hingedly connects flap 31 to the remainder of a bottom portion of the sleeve 30. The bottom end of closure flap 31 preferably takes a frusto-conical shape so as to protrude into sealing relation with inlet opening 17′ by engaging a tapered annular face defining said inlet opening 17′. Alternatively, the nonreturn valve can be formed integrally with the inlet end portion of the first nozzle body 17 having the closure flap integrally connected thereto by a web acting as a hinge. Other types of nonreturn valves may be applied, if desired, for controlling let opening 17′ in response to a differential pressure upstream and downstream of said opening 17′.

Adjacent the upper end of stripe chamber 6, first nozzle body 17 is formed with circumferentially spaced port means in the form of openings or slots which will be referred to as color dispensing openings 18 as the description proceeds. In the present example, stripe chamber 6 contains a second product, for instance, a pasty coloring substance, filling the annular spaced of stripe chamber 6 from the top to a level just above the lower end of first nozzle body 17 whereat it is in contact with the first pasty product to be dispensed, for instance, toothpaste, filling the interior space 3 of container 2 and pump chamber 5.

Detent projections 27*a* are provided on diametrally opposite locations on the outer peripheral surfaces 8′ of pump cylinder 7 and stripe chamber cylinder 8, and on the interior surface of second nozzle body 15, for fixedly mounting the second nozzle body 15 on container 2. The second nozzle body 15 forms an extension of dispensing passage 20'. In the same manner as first nozzle body 17, second nozzle body 15 is formed as an injection-molded plastic member. Second nozzle body is mounted by a snap-fit on pump cylinder 7 and stripe chamber cylinder 8 and has a depending peripheral portion engaging a shoulder 26 of container 2. Second nozzle body 15 thus forms the end of dispensing passage 20' including outlet opening 16. The latter is adapted to be opened and closed by a plastic shutter member 20 having a foot portion 22 retained in a pocket 19 of second nozzle body 15.

Stripe chamber cylinder 8, nozzle bodies 15 and 17 with dispensing passage 20', nonreturn valve 29, outlet opening 16, and shutter member 20 cooperating therewith together form a dispensing unit A in the head assembly of dispenser 1.

For the operation of dispenser 1, the head assembly is further provided with a piston delivery mechanism comprising pump cylinder 7 of pump chamber 5 with piston 10 slidably mounted therein, an upper actuating cap 13, a tubular actuating stem 12 connecting actuating cap 13 to piston 10, and a return coil spring 14 compressed between an upper surface of pump cylinder 7 and an interior bottom surface of actuating cap 13. The upper surface of the top portion of pump cylinder 7 has an integrally formed tubular guide sleeve 11 in which stem 12 is slidably mounted. Second nozzle body 15 is formed with an outer surface area corresponding to the outer shape of actuating cap 13 so as to act as guide means therefor (cf. also FIG. 2).

Figure 3:
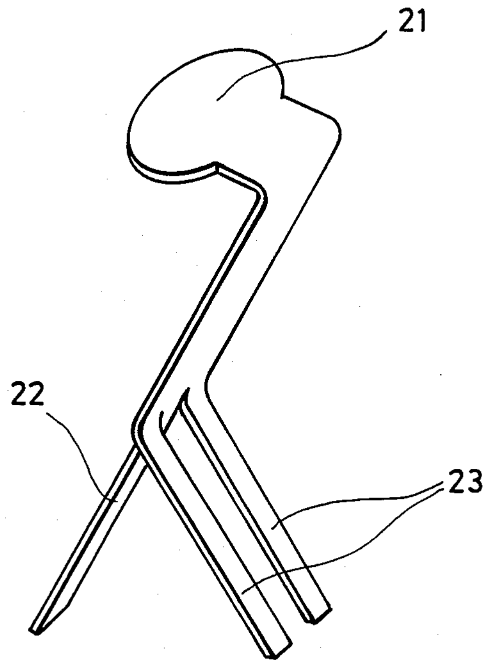
FIG. 3 shows a perspective view of a shutter member of the dispenser.

Actuating cap 13 is formed with nose-shaped projections 25 cooperating with shutter member 20 for opening and closing outlet opening 16 in a manner described in the following with reference also to FIG. 3.

Plastic shutter member 20 is formed as an angular strip body having an upper substantially circular closure portion 21 for covering outlet opening 16 in the closed position, and a lower foot portion 22 which extends at an angle from closure portion 20 and is fixedly received in pocket 19 of second nozzle body 15. Extending from a central portion of shutter member 20 adjacent foot portion 22 and on both sides thereof are obliquely inclined strip-shaped actuating fingers 23 extending toward pump cylinder 7 to respective locations underneath actuating cap 13. By mounting foot portion 22 of shutter member 20 in pocket 19 of second nozzle body 15, shutter member 20 is fixedly secured adjacent one end, so that the portion thereof extending above actuating fingers 23 is pivotable by exerting a suitable pressure on actuating fingers 23. This pressure is adapted to be exerted by nose-shaped projections 25 of actuating cap 13 engaging actuating fingers 23 adjacent their root portions which constitute an angular connection with the remainder of shutter member 20.

The head assembly of dispenser 1 can be covered by a closure cap 28, which has an outer skirt having means in the form of a detent nose 27*b* engaged in a snap fit connection with a similar detent nose 27*b* formed on second nozzle body 15. In the engaged state, closure cap 28 is seated on shoulder 26 of container 2, so that it conforms to the outer peripheral contour of the container so that its outer wall forms an extension of that of container 2, resulting in a completely smooth outer contour of the dispenser in the closed state.

Figure 2:
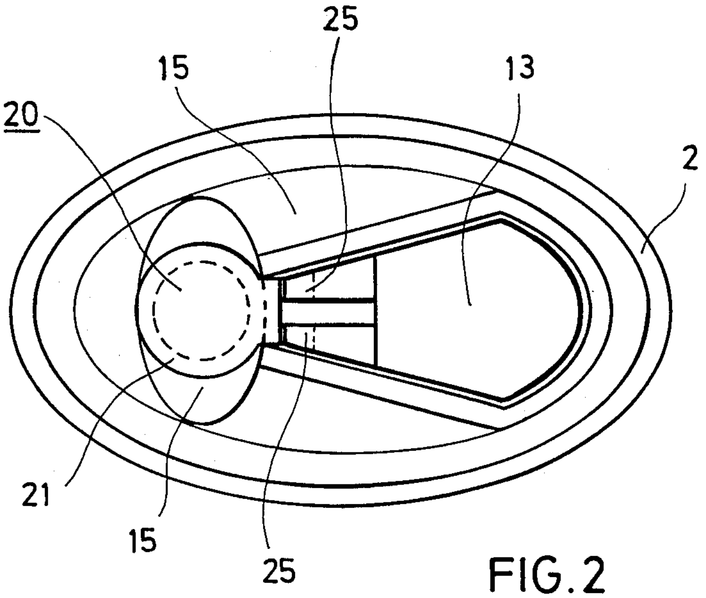
FIG. 2 shows a diagrammatic top plan view of the head assembly of the dispenser.

As particularly shown in FIG. 2, the container of dispenser 1, depicted by way of example, is of oval or elliptical cross-sectional shape, resulting in an ergonomically favorable configuration of dispenser 1 to facilitate the handling thereof. This configuration is specifically made possible by the radially arranged design of dispensing unit A, with stripe chamber cylinder 8 and pump cylinder 7 being located radially adjacent one another. The handling of dispenser 1 is further facilitated by the face that actuating cap 13 is disposed at a lower level than outlet opening 16.

With reference to FIG. 2, there is shown a top plan view of dispenser 1 with closure cap 28 removed. This illustration shows the elliptical cross-sectional shape of the dispenser as a whole as well as the fact that second nozzle body 15 is likewise of oval shape at the location of dispensing passage 20' and outlet opening 16, respectively, the same applying also to stripe chamber cylinder 8. It is, of course, also possible to provide a circular cross-sectional shape for the stripe chamber cylinder and for second nozzle body 15 at the location of dispensing passage 20'. This applies also to the container itself, which may, if so desired, be formed as a straight circular cylinder, in which case closure cap 28 and second nozzle body 15 will, of course, have a corresponding shape.

Also shown in detail in FIG. 2 are projections 25 of actuating cap 13 designed to act on actuating fingers 23 of shutter member 20. The respective parts may, of course, have another suitable shape. In particular, actuating cap 13 may be configured so as to act on actuating fingers 23 without having to resort to the use of specific projections. Delivery piston 10 has a central cup portion 10' which is connected to tubular actuating stem 12. Piston 10 is formed as a stepped piston having an end face projecting above a pair of annular sealing lips in the actuating direction. This results in a reduction of pressure loads and in improved sealing of piston 10 within pump cylinder 7. The cylinder 7, piston 10, actuating stem 12, actuating cap 13 and return spring 14 comprise a pump mechanism.

The dispenser described above is designed as a piston dispenser particularly for dispensing a two component product in the form of an extrusion provided, for instance, with ornamental color stripes. Its manufacture and assembly is particularly facilitated by the omission of any valve means between both pump chamber 5 and container cavity 3, on the other hand, and by the side-by-side arrangement of its dispensing unit A and the pressurizing or pump mechanism. After the formation of container 2 with pump cylinder 7 and stripe chamber cylinder 8 as an integral unit, all that is required is to insert first nozzle body 17 into a collar portion of stripe chamber cylinder 8 in a press fit, and to mount second nozzle body 15 including shutter member 20 in a snap fit on the peripheral surfaces 7', 8' of pump cylinder 7 and stripe chamber cylinder 8, respectively. The delivery piston 10 is the only part to be mounted from within the container. After insertion of piston 10 into pump chamber 5 and mounting return spring 14, the snap fit connection is established between piston 10 and actuating stem 12 by depressing actuating cap 13. After the head assembly of dispenser 1 has been thus assembled, the dispenser is turned upside down to be filled in this position. In a first step, annular stripe chamber 6 may be filled with a pasty or highly viscous colored substance to a level closely adjacent the free end of first nozzle body 17 with inlet opening 17' and nonreturn valve 29.

The container of dispenser may then be filled with the main product, for instance, toothpaste, beginning with the filling of pump chamber 5. In the area of stripe chamber 6, the main product mass comes into contact with the free surface of the colored substance contained therein and is brought into communication with inlet opening 17' of first nozzle body 17. After container 2 has been completely filled, follower piston 4 is inserted, whereafter dispenser 1 is ready for use. Closure cap 28 may have been previously mounted on second nozzle body 15, or may be so mounted as a finishing step.

The dispenser described above operates as follows:

Proceeding from the state shown in FIG. 1, in which container 2 including pump chamber 5 is filled, for instance, with toothpaste, and stripe chamber 6 is filled, for instance, with a colored substance to a level shortly above inlet opening 17', closure cap 28 is removed, and actuating cap 13 is subsequently depressed against the force of return spring 14. This causes projections 25 of actuating cap 13 to be moved downwards to thereby depress actuating fingers 23. Due to the stiffness of the root portions of fingers 23 connecting them to the remainder of shutter member 20, the portion of shutter member 20 adjacent this root portion acts as a hinge 24 about which the upper portion of shutter member 20 including closure portion 21 is pivoted outwards as shown by dotted lines in FIG. 1. At the same time, the pressure generated by the downward movement of piston 10 and maintained by the expansion spring of follower piston 4 causes the toothpaste in container 2 to be displaced through inlet opening 17' of first nozzle body 17 pivoting closure flap 31 of nonreturn valve 29 upwardly into its open position and passing through dispensing passage 20' to be thus dispensed through outlet opening 16. The operation of piston 10 may also result in a pressure rise at the boundary between the toothpaste and the colored paste in stripe chamber 6. As the displaced toothpaste flows past the peripheral color dispensing openings 18 of the first nozzle body 17, the resulting differential pressure causes limited amounts of the color paste to flow through opening 18 and to be deposited on the periphery of the toothpaste body in dispensing passage 20', so that the toothpaste body in passage 20' above color outlet openings 18 is provided with longitudinal color strips in accordance with the arrangement of color dispensing openings 18 about nozzle body 17. Depending on the volume relationship between pump chamber 5 and dispensing passage 20', it may be required on first use of the dispenser 1 to actuate piston 10 in a "lost stroke" for advancing the product to be dispensed towards outlet opening 16, whereupon the second and any following actuation of the dispenser will cause the product to be realiably dispensed from outlet opening 16.

After a length of the toothpaste extrusion provided with longitudinal color stripes has been thus dispensed, this length being dependent on the respective stroke of piston 10, the subsequent release of actuating cap 13 and the resultant upwards displacement of piston 10 in pump chamber 5 result in a pressure drop within the dispenser, causing the product to retract from the outlet opening by a small distance for a smooth and clean termination of the dispensing process. Simultaneously, suction-stroke of piston 10 causes closure flap 31 to return to its rest position obturating inlet opening 17'. Slight retrograde movement of the mass in dispensing passage 20' downstream of closure flap 31 contributes further to return closure flap 31 to its closure position covering inlet opening 17'. Thus, pressure responsive nonreturn valve 29 is effective in supporting reliable operation and function of the dispenser. At the same time, the aforementioned pressure drop causes follower piston 4 to be advanced by the action thereon of the atmospheric pressure, so that the toothpaste within container 2 is fed towards the head assembly until pressure equilibrium is established. The return movement of actuating cap 13 also results in actuating fingers 23 being released, permitting shutter member 20 to return to its closed position as shown in solid lines in FIG. 1. In this manner, the dispenser according to the invention is reliably operable without the provision of any valves between the container interior 3 and pump chamber 5 for dispensing any suitable pasty product, and permitting any such product to be dispensed with any desired color pattern.

When dispenser 1 is used, for instance, for dispensing pasty food compositions, the stripe chamber may, for instance, be filled with a pasty spice composition, so that the food composition contained in container 2 and pump chamber 5 can be provided with determined amounts of the spice composition distributed about the periphery of the product extrusion being dispensed.

The dispenser according to the present invention is thus suitable for use with an extensive variety of products in the cosmetic and medical fields, in the field of cleaning and polishing products, and even for the metered delivery of food products.

The cross-sectional configuration of container 2 may be varied within a wide range as desired by the user. It may thus be circular or of any other suitable shape.

What is claimed is:

1. A dispenser for pasty products comprising a container (2) having a wall defining a cavity (3) for containing the product, top and bottom ends and a following piston (4) slidably mounted in said container cavity to close said bottom end, a head assembly mounted in said top upper end including a manually operable delivery unit having a pump chamber (5) and a delivery piston (10) reciprocally mounted therein, said delivery piston said delivery piston having an actuating cap (13) attached to an end thereof said pump chamber being connected in valve-free, open, unrestricted flow relation with said container cavity to freely communicate therewith, and a dispensing unit (A) including: means defining a product dispensing passage (20') having a product outlet opening (16), and an inlet opening (17') in flow communication with said product cavity; a nonreturn closure valve means (29) mounted in said inlet opening; and a stripe chamber (6) disposed adjacent said pump chamber in side-by-side relation thereto, said stripe chamber being connected in valve-free open, unrestricted flow relation with said product cavity to freely communicate therewith and having a striping material dispensing opening (18) to provide direct flow communication with said product dispensing passage;

said pump chamber comprising a pump cylinder; said dispensing unit (A) comprising a stripe chamber cylinder (8) defining said stripe chamber (6), wherein said means defining said dispensing passage comprises a first nozzle body (15, 17), a shutter member (20) mounted for movement to selectively open and close said outlet opening (16) of said nozzle body (15, 17);

said nozzle body (15), having a pocket 19, said pump cylinder (7) having a guide sleeve portion (11) and said shutter member (20) is formed in the shape of an angular strip member having a closure portion (21) and a foot portion (22) received in said pocket (!9) of said nozzle body (15), with two actuating fingers (23) angularly projecting at both sides of said foot portion (22) to extend in the direction towards said guide sleeve portion (11) of said pump cylinder (7).

2. A dispenser according to claim 1, characterized in that said actuating cap (13) is formed with a pair of node-shaped projections (25) engaging said actuating fingers (23) of said shutter member (20) adjacent the angle formed by said actuating fingers (23).

3. A dispenser according to claim 2, characterized in that the angular connection of said actuating fingers (23) with said shutter member (20) acts as a hinge (24) of said shutter member (20).

4. In a dispenser for simultaneously dispensing first and second pasty products through one outlet (16) comprising:

a container including wall means defining a cavity (3) for containing said first product, said cavity having a top end, an open bottom end portion, and an inner surface;

a piston (4) mounted in said container cavity to close said bottom end and slidably displaceable along said inner surface by the action of environmental atmospheric pressure;

a head assembly mounted on said top end and including a manually operable delivery mechanism having a pump chamber (5), a first opening in said pump chamber, and a delivery piston (10) slidably mounted in said pump chamber for movement in one direction, to apply dispensing pressure to force product through said first opening to said cavity and for return movement in an opposite direction, a product dispensing unit (A) having a nozzle body comprising first and second tubular nozzle body portions (15, 17) defining a dispensing passage 20' that includes a dispensing outlet and an inlet (17') in communication with said cavity, and a nonreturn valve means (29) mounted to close said dispensing passage during said return movement of said delivery piston;

the improvement comprising:

said dispensing unit including a cylindrical stripe chamber (6) for containing said second product, said stripe chamber having an upper portion having a nozzle mounting opening therethrough, a cylinder (8) having an outer peripheral surface, a port means (18) establishing flow communication between said stripe chamber (6) and said dispensing passage 20', and a second opening;

said first nozzle body portion having an upper end mounted in said nozzle mounting opening in said upper portion of said stripe chamber with said first nozzle body portion extending into said stripe chamber to define therewith an annular space constituting said stripe chamber;

said stripe chamber (6) and said pump chamber (5) mounted on said top end in adjacent side-by-side relation to each other with said first and second openings connected in open free communication with said container cavity so that in operation, sliding of said delivery piston will create pressure in said cavity which will be applied to said first product to force said first product through said inlet (17') and to simultaneously force said second product through said port means into said dispensing passage as said first product is passing therethrough.

5. A dispenser according to claim 4, wherein said nozzle body (15, 17) has a lower inlet end portion with said inlet (17') being in said lower inlet end portion, and wherein said nonreturn valve (29) is mounted at said lower inlet end portion.

6. A dispenser according to claim 5, wherein said nonreturn valve (29) comprises a valve sleeve (30) and wherein said closure member (31) is integrally formed with and hingedly connected to said valve sleeve for engagement with said inlet opening (17').

7. A dispenser according to claim 6, wherein said nonreturn valve (29) is integrally made of synthetic resin.

8. A dispenser according to claim 4, wherein said pump chamber includes a pump cylinder (7) having an outer peripheral surface (7') and wherein said second nozzle body (15) has said dispensing outlet opening (16) therein and is fixedly mounted on said outer peripheral surfaces (8', 7') of said stripe cylinder (8) and said pump cylinder (7).

9. A dispenser according to claim 8, wherein an actuating cap (13) is mounted on said delivery piston (10), and wherein said second nozzle body (15) has a guide means in surrounding relation to said actuating cap (13).

10. A dispenser according to claim 9, wherein said delivery piston (10) has a pair of annular sealing lips and a central cup portion (10'), and wherein said actuating cap (13) has an elongated tubular stem (12) having an end which snap fits into said central cup portion.

11. A dispenser according to claim 10, wherein said pump cylinder (7) has a top portion formed with a tubular guide sleeve (11) for receiving said tubular stem (12), and wherein a spring (14) is disposed between said actuating cap (13) and the top portion of said pump cylinder (7) coaxially about said tubular actuating stem (12) with said guide sleeve acting as a guide element for said return coil spring.

12. A dispenser according to claim 9, wherein said actuating cap (13) is mounted at a level below that of said outlet opening (16).

13. A dispenser according to claim 4, wherein said nozzle body has a pocket (19), said dispenser includes a shutter member (20) mounted on said nozzle body for closing said dispensing outlet (16), said shutter member including an angular strip member having a closure portion (21), a foot portion (22) extending at an angle from said closure portion and mounted in said pocket (19), and two actuating fingers (23) projecting at an angle from opposite sides of said foot portion to provide an angular connection with said foot portion whereby said fingers project toward said pump cylinder.

14. A dispenser according to claim 13, wherein an actuating cap (13) is mounted on said delivery piston, said actuating cap (13) having a pair of nose-shaped projections (25) engaging said actuating fingers (23) of said shutter member (20) adjacent the point where said actuating fingers (23) project from said foot portion.

15. A dispenser according to claim 14, wherein said angular connection of said actuating fingers (23) with said shutter member (20) is flexible and acts as a hinge (24).

16. A dispenser according to claim 4, wherein said first nozzle body (17) has a length within said stripe chamber (6) that substantially corresponds to the axial length of said strip chamber.

17. A dispenser according to claim 4, wherein said container (2), said stripe chamber cylinder (8) and said pump cylinder (7) defining said pump chamber (5) are formed as an integral plastic structure.

18. A dispenser according to claim 17, wherein said pump cylinder (7) and/or said stripe chamber cylinder (8) are of circular cross-sectional shape.

19. A dispenser according to claim 17, wherein said pump cylinder (7) and said stripe chamber cylinder (8) have a common wall portion (9).

20. A dispenser according to claim 4 wherein said container (2) has a noncircular, elliptical cross-sectional shape.

21. A dispenser according to claim 4, wherein:

said container's upper end has a shoulder (26), said second nozzle body (15) has a depending peripheral portion which abuts said shoulder (26), said dispenser has a closure cap (28) sized to enclose said head assembly and said product dispensing unit, said cap having an outer skirt conforming to the outer peripheral contours of said container, and means (**27*b***) on said closure cap for securing said cap in a snap fit relation on said second nozzle body peripheral portion.

22. A dispenser according to claim 4, characterized in that said stripe chamber (6) contains a color paste.

23. A dispenser for pasty products comprising a container (2) having a wall defining a cavity (3) for containing the product, top and bottom ends and a following piston (4) slidably mounted in said container cavity to close said bottom end, a head assembly mounted in said upper end including a manually operable delivery unit having a pump chamber (5) and a delivery piston (10) reciprocally mounted therein, said pump chamber being connected in valve-free, open, unrestricted flow relation with said container cavity to freely communicate therewith, and a dispensing unit (A) having a a stripe cylinder (6) defining a stripe chamber (8), at least, one nozzle body (15) defining a dispensing passage (20') and having an outlet opening (16) and a pocket (19), a shutter member (20) mounted on said container for movement to open and close said outlet opening, said shutter member being in the shape of an annular strip member having a closure portion (21), a foot portion (22) received in said pocket (19), and two actuating fingers (23) having an angular connection at both sides of said foot portion to project towards said pump chamber (5), and an actuating cap (13) mounted adjacent said pump chamber (5) to reciprocate said delivery piston, said cap having a pair of node-shaped projections (25) engaging said actuating fingers adjacent said angular connection of said actuating fingers with said shutter member 20 acting as a hinge to permit said opening and closing movement of said shutter member.

* * * * *